United States Patent
Ni et al.

(10) Patent No.: US 8,762,918 B2
(45) Date of Patent: Jun. 24, 2014

(54) BANDED COMPUTATION ARCHITECTURES

(71) Applicant: Synopsys, Inc., Mountain View, CA (US)

(72) Inventors: Min Ni, Campbell, CA (US); Zongwu Tang, Pleasanton, CA (US); Qing Su, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/908,937

(22) Filed: Jun. 3, 2013

(65) Prior Publication Data

US 2013/0263076 A1 Oct. 3, 2013

Related U.S. Application Data

(62) Division of application No. 12/631,167, filed on Dec. 4, 2009, now Pat. No. 8,458,635.

(51) Int. Cl.
*G06F 17/50* (2006.01)
*G06F 11/22* (2006.01)

(52) U.S. Cl.
USPC ............ 716/119; 716/123; 716/136

(58) Field of Classification Search
CPC ........... G06F 17/5072; G06F 17/5068; G06F 17/5077; G06F 17/5045; G06F 17/5081; G06F 17/5036; G06F 17/5022
USPC ......................... 716/119, 123, 136
See application file for complete search history.

(56) References Cited

U.S. PATENT DOCUMENTS

| | | | |
|---|---|---|---|
| 6,081,658 A | 6/2000 | Rieger et al. | |
| 6,510,534 B1 * | 1/2003 | Nadeau-Dostie et al. | .... 714/724 |
| 7,523,429 B2 | 4/2009 | Kroyan et al. | |
| 7,536,664 B2 | 5/2009 | Cohn et al. | |
| 7,546,558 B2 | 6/2009 | Beale | |
| 7,861,060 B1 | 12/2010 | Nickolls et al. | |
| 8,458,635 B2 | 6/2013 | Ni et al. | |
| 2005/0268256 A1 | 12/2005 | Tsai et al. | |

(Continued)

OTHER PUBLICATIONS

Cong, Jason, et al., "FPGA-Based Hardware Acceleration of Lithographic Aerial Image Simulation," ACM Transactions on Reconfigurable Technology and Systems, vol. 2, No. 3, Article 17, Sep. 2009, 29 pages.

(Continued)

*Primary Examiner* — Stacy Whitmore
*Assistant Examiner* — Magid Dimyan
(74) *Attorney, Agent, or Firm* — Haynes Beffel & Wolfeld LLP

(57) ABSTRACT

A convolution of the kernel over a layout in a multi-core processor system includes identifying a sector, called a dynamic band, of the layout including a plurality of evaluation points. Layout data specifying the sector of the layout is loaded in shared memory, which is shared by a plurality of processor cores. A convolution operation of the kernel and the evaluation points in the sector is executed. The convolution operation includes iteratively loading parts of the basis data set, called a stride, into space available in shared memory given the size of the layout data specifying the sector. A plurality of threads is executed concurrently using the layout data for the sector and the currently loaded part of the basis data set. The iteration for the loading basis data set proceeds through the entire data set until the convolution operation is completed.

19 Claims, 8 Drawing Sheets

(56) References Cited

U.S. PATENT DOCUMENTS

| | | | |
|---|---|---|---|
| 2006/0242618 A1 | 10/2006 | Wang et al. | |
| 2007/0255903 A1 | 11/2007 | Tsadik et al. | |
| 2009/0327984 A1* | 12/2009 | Bormann et al. | 716/5 |
| 2010/0023916 A1 | 1/2010 | Chew et al. | |
| 2010/0158408 A1 | 6/2010 | El-Mahdy et al. | |
| 2012/0020155 A1* | 1/2012 | Kim | 365/185.03 |
| 2012/0246116 A1* | 9/2012 | Yang et al. | 707/634 |
| 2013/0080688 A1* | 3/2013 | Park et al. | 711/103 |

OTHER PUBLICATIONS

Cong, Jason, et al., "Lithographic Aerial Image Simulation with FPGA-Based Hardware Acceleration," FPGA '08, Feb. 24-26, 2008, Monterey, CA 10 pages.

Drepper, Ulrich, "What Every Programmer Should Know About Memory," Red Hat, Inc., Version 1.0, Nov. 21, 2007, 114 pages.

Kanter, David, "NVIDIA's GT200: Inside a Parallel Processor," Real World Technologies, Sep. 8, 2008, 12 pages.

Seiler, Larry, et al., "Larrabee: A Many-Core x86 Architecture for Visual Computing," ACM Transactions on Graphics, vol. 27, No. 3, Article 18, Aug. 2008, 16 pages.

Sun Microsystems, Inc., "What Every Computer Scientist Should Know About Floating-Point Arithmetic," Part No. 800-7895-10, Rev. A, Jun. 1992, 74 pages.

\* cited by examiner

```
1:  load flash data from global to shared memory as a 1D array flashes;
2:  _syncthreads();
3:  for all basis i in the basis list do
4:      intensity[i] = 0;
5:      load one 1D basis for H zone convolution to shared memory;
6:      _syncthreads();
7:      for all flash_type in [acute, corner, obtuse] do
8:              for all stride_idx in [0, ..., 129/row_per_stride] do
9:                      load row_per_stride rows of 2D basis kernel of type type;
10:                     _syncthreads();
11:                     bisearch the fstart and fend flashes for current stride stride_idx;
12:                     for all flashidx in [fstart, fend) do
13:                             if flashes[flash_idx] is in B zone then
14:                                     intensity[i] += ConvolveBZoneFlash();
15:                             else if flashes[flash_idx] is in H zone and is not the last one on
                                        the same row then
16:                                     hflash_cnt += flash_type[flash_idx];
17:                             else
18:                                     intensity[i] += hflash_cnt * ConvolveHZoneFlash();
19:                             end if
20:                     end for
21:                     _syncthreads();
22:             end for
23:     end for
24:     load one 1D basis for V zone convolution to shared memory;
25:     _syncthreads();
26:     bisearch the fstart and fend flashes for current stride stride idx;
27:     for all flash_idx in [fstart, fend) do
28:             if flashes[flash_idx] is in V zone then
29:                     ConvolveVZoneFlash();
30:             else
31:                     fflash_cnt += flash_type[flash_idx].
32:             end if
33:     end for
34:     intensity[i] += fflash_cnt * K(i)
35:     write back intensity[i] to global memory;
36: end for
```

FIG. 10

Copyright Synopsys 2009

BANDED COMPUTATION ARCHITECTURES

RELATED APPLICATIONS

This application is a divisional of U.S. patent application Ser. No. 12/631,167 filed on 4 Dec. 2009, (now U.S. Pat. No. 8,458,635), which application is incorporated by reference as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to electronic design automation (EDA), and to application of multi-core processing systems to EDA.

2. Description of Related Art

Leading general purpose microprocessors and graphic processors are being implemented using multi-core architectures in single integrated circuits. As a result, multi-core systems are becoming widely available.

Multi-core processing systems, on one or more integrated circuits, are characterized by having from two (2) to many processor cores arranged for concurrently executing threads in symmetric or asymmetric multi-threading programs. The multi-threading programs partition work among the threads on the processor cores for concurrent operation, and can provide significant performance improvements. Multiple concurrently operating threads need access to a common data set and can need access to the results of operations in other threads. Shared access to data among the processor cores is provided using a combination of shared memory and message passing protocols.

Shared memory architectures can vary widely from platform to platform. A common architecture involves the use of shared cache memory. Shared cache memory allows high speed signaling for cache coherency and data access to the executing cores. The cost of implementing cache memory space is relatively high, and so such designs have relied sometimes upon smaller cache sizes. Thus, the shared cache can become a bottleneck in operations requiring large data sets.

In EDA systems, some processes involve convolution operations over large data sets, and can take a very long time to execute. One such convolution operation is referred to as aerial image simulation, used for EDA processes like optical proximity correction in lithographic imaging systems. See, Rieger, et al., U.S. Pat. No. 6,081,658, entitled "Proximity Correction System for Wafer Lithography," issued 27 Jun. 2000. Rieger et al. is incorporated by reference as if fully set forth herein. For aerial image simulation, layout data that defines a pattern on a photolithographic mask, for example, is convolved with a kernel that determines point-by-point intensity of an image produced by an exposure using a light source represented by the kernel. Often, many kernels are used in the convolution process over a single layout to produce a usable result like an aerial image simulation. Rieger et al. describes an optimization of the convolution process referred to as flash-based convolution, in which the layout data is decomposed into unit shapes called "flashes", and the intensity results for kernels used in the simulation are pre-computed for the flashes, and stored as basis data in lookup tables. The simulation is simplified in flash-based convolution to a series of table lookup and accumulation operations, and can provide improved performance in many circumstances.

It has been proposed to apply multi-core processing for reducing the computation times for convolution operations used for aerial image simulation and other EDA procedures. See, Wang, et al., U.S. Patent Application Publication No. 2006/0242618 A1, entitled "Lithographic Simulations Using Graphical Processing Units", published 26 Oct. 2006; and Cong, et al., "Lithographic Aerial Image Simulation with FPGA-Based Hardware Acceleration", FPGA '08, Feb. 24-26, 2008, Monterey, Calif. Cong, et al. is incorporated by reference as if fully set forth herein. However, the layout data, the basis and the resulting image data can be very large files, so that it would not be practical to place them in memory shared by multiple concurrently executing threads. Therefore, memory operations can become a significant limit to the performance improvements available in prior art systems.

Multi-core and many core architectures such as encountered in graphics processing units can be characterized by strong computing power and relatively weak memory accessibility. Thus convolution operations using these architectures must trade-off computation with memory access.

Problems remain therefore with optimizing convolution algorithms used in EDA systems to take full advantage of multi-core processing, including problems with managing shared memory.

SUMMARY

Efficient convolution on a multi-core architecture is accomplished using a dynamic banding and stride-based algorithm. The layout can be divided into bands and only layout data relevant to a particular band needs to be loaded in the shared memory of a multi-processor at a time. The size of the band can vary, and be determined at runtime based on the locations of the evaluation points in the band and the data needed to specify the features of the layout relevant to convolution of the evaluation points within the band. A dynamically identified band of the layout can be loaded in shared memory for use by a plurality of threads concurrently operating in the multi-processor on evaluation points in the band. A convolution process for a multi-core architecture as described below, also synchronizes the searching of basis data for the evaluation points subject of concurrently executing threads. In one technique, the basis data set is traversed by loading only part of the data set, referred to herein as a stride, in shared memory at a time. The size of the stride can be determined dynamically at runtime, based on the amount of space available in the shared memory given the size of the layout data for the dynamic band.

A method for performing a convolution of the kernel over a plurality of evaluation points in a layout is described for use in a multi-core processor system having shared memory. The method includes identifying a sector, called a dynamic band, of the layout including a plurality of evaluation points, where the sector includes a portion of the layout relevant to a convolution of a kernel and the layout for a plurality of evaluation points. Also, the process loads layout data specifying the sector in a shared memory of a multi-processor. A convolution operation of the kernel and the layout for a plurality of evaluation points in the sector is executed. The convolution operation includes iteratively loading parts of the basis data set for the kernel, or parts a plurality of basis data sets for a corresponding plurality of kernels, into space available in shared memory given the size of the layout data specifying the sector until all of the basis data set is traversed. The basis data set comprises pre-computed convolution results, such as a set of tables for a corresponding set of basis units, which store the results of convolution of the kernel over the corresponding basis units. The basis units an integrated circuit layout can be shapes such as polygons or half-plane functions as described above in the Rieger et al. and Cong et al. publications. A plurality of threads is executed concurrently in the multi-processor using the layout data for the sector, which can be expressed using the basis units of the basis data set, and the currently loaded part of the basis data set. The iteration for loading the parts of the basis data set proceeds through one or more basis data sets relevant to the evaluation points in the current dynamic band until the convolution operation is completed.

The process can involve identifying a plurality of dynamic bands or sectors of the layout, each of which includes a plurality of evaluation points. Layout data for each of the sectors is distributed to a corresponding plurality of multi-processors with their respective shared memory in one embodiment, and the convolution operation is completed for each sector, utilizing the plurality of multi-processors in the manner described above.

In a procedure described here, the layout data can be flash-based data, which represents the layout by a combination of shapes selected from a predetermined set of shapes. The layout includes an array including a data structure specifying the predetermined shape and its location, for each shape in the combination. A basis data set in a flash-based system comprises a plurality of lookup tables containing results of convolution of the kernel over each of the predetermined shapes. The tables can be indexed by locations within the shape.

The techniques described herein can be applied to aerial image simulation of a plurality of evaluation points, and to other convolution operations useful in electronic design automation and other systems.

A data processing system is described that is adapted for performing a convolution of the kernel over a plurality of evaluation points in the layout. The data processing system having memory storing instructions executable by the multi-core processor, storing a layout file representing a layout and storing a basis data set storing convolution results for one or more kernels. The data processing system can have a plurality of multi-processors having respective shared memories. Instructions in the system relevant to the convolution operation include logic to identify a sector in the layout including a plurality of evaluation points as described above. Also, the instructions include logic to load from the layout file, layout data specifying the sector of the layout in a shared memory and to perform a convolution operation of the kernel and the layout data for the plurality of evaluation points. Convolution operations as described above include iteratively loading parts of a basis data set into space available in shared memory, given the size of the layout data specifying the current sector, and executing a plurality of threads concurrently in the multi-core processor using the layout data and a currently loaded part of the basis data set, until the plurality of evaluation points in the sector is evaluated over the data set.

An article of manufacture is described which comprises a machine readable data storage medium storing instructions executable by a data processing system such as described above.

Convolution operations are utilized in electronic design automation. The execution of convolution operations of large data files can take significant time and computing resources to complete. Techniques are described here which support and optimize hardware acceleration of convolution operations, by tailoring the convolution to many-core architectures.

The techniques described here can also be applied in other processor architectures with beneficial results. For example, a method is described for determining results of a function of a target data set and an operation at evaluation points in the target data set. According to this method, a computer identifies a sector of the target data set including a plurality of evaluation points, the sector including a portion of the target data set relevant to the function for the plurality of evaluation points in the sector. The computer loads a band of data specifying basis units of the sector of the target data set in a memory, and performs an operation to determine the results of the function for the plurality of evaluation points in the sector. The operation includes iteratively loading parts of a basis data set into space available in the memory given the size of the band of data specifying the sector, where the basis data set represents results of the function for basis units of the target data set. The computer executes a thread using the band of data for the sector and a currently loaded part of the basis data set in the memory, in an iterative process, until the plurality of evaluation points in the sector is evaluated over the basis data set for the basis units in the band.

Other aspects and advantages of the present invention can be seen on review of the drawings, the detailed description and the claims, which follow.

BRIEF DESCRIPTION OF THE DRAWINGS

FIG. 10 is pseudocode for a representative embodiment of a convolution algorithm as described herein.

DETAILED DESCRIPTION

A detailed description of embodiments of the present invention is provided with reference to FIG. 1 through FIG. 10.

Figure 1:
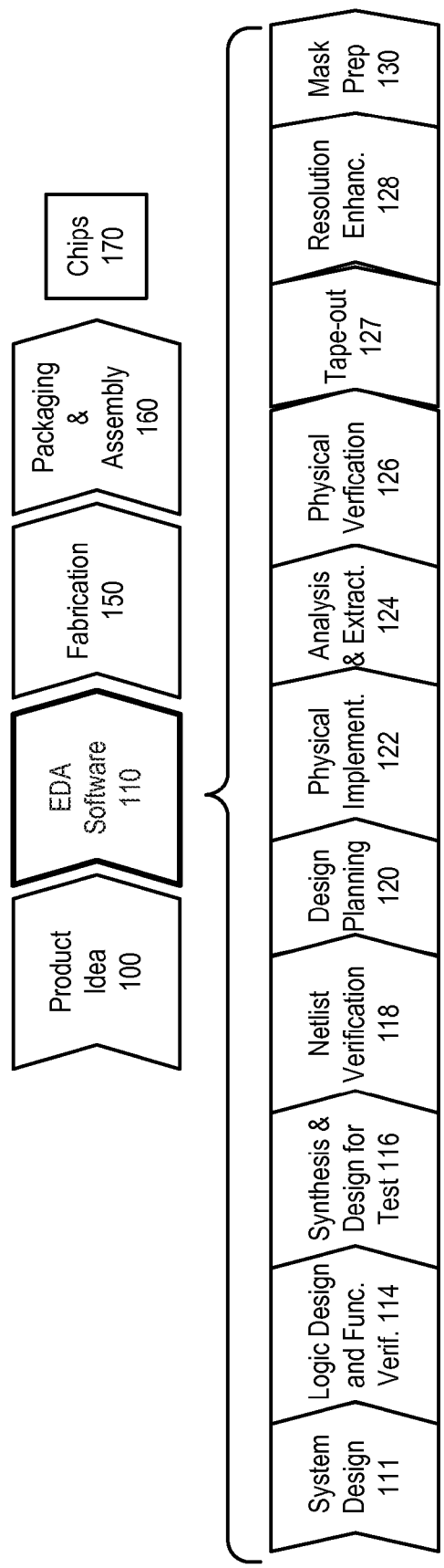
FIG. 1 is a simplified representation of an illustrative integrated circuit design flow, in which convolution operations as described here can be employed.

FIG. 1 is a simplified representation of an illustrative integrated circuit design flow. As with all flowcharts herein, it will be appreciated that many of the steps of FIG. 1 can be combined, performed in parallel or performed in a different sequence without affecting the functions achieved. In some cases a rearrangement of steps will achieve the same results only if certain other changes are made as well, and in other cases a rearrangement of steps will achieve the same results only if certain conditions are satisfied. Such rearrangement possibilities will be apparent to the reader.

At a high level, the process of FIG. 1 starts with the product idea (block 100) and is realized in an EDA (Electronic Design Automation) software design process (block 110). When the design is finalized, the fabrication process (block 150) and packaging and assembly processes (block 160) occur, ultimately resulting in finished integrated circuit chips (result 170).

The EDA software design process (block 110) is composed of a number of steps 111-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (block 110) will now be provided.

System design (block 111): The designers describe the functionality that they want to implement, they can perform what-if planning to refine functionality, check costs, etc. Hardware-software architecture can occur at this stage. Example EDA software products from Synopsys, Inc. that can be used at this step include Model Architect, Saber, System Studio, and DesignWare® products.

Logic design and functional verification (block 114): At this stage, high level description language (HDL) code, such as the VHDL or Verilog code, for modules in the system is written and the design is checked for functional accuracy. More specifically, the design is checked to ensure that it produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (block 116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Complier, FPGA Compiler, TetraMAX, and DesignWare® products.

Netlist verification (block 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (block 120): Here, an overall floor plan for the chip is constructed and analyzed for timing and top-level routing. Example EDA software products from Synopsys, Inc. that can be used at this step include Astro and IC Compiler products.

Physical implementation (block 122): The placement (positioning of circuit elements) and routing (connection of the same) occurs at this step. Example EDA software products from Synopsys, Inc. that can be used at this step include AstroRail, Primetime, and Star RC/XT products.

Analysis and extraction (block 124): At this step, the circuit function is verified at a transistor level, this in turn permits what-if refinement. Example EDA software products from Synopsys, Inc. that can be used at this stage include AstroRail, PrimeRail, Primetime, and Star RC/XT products.

Physical verification (block 126): At this stage various checking functions are performed to ensure correctness for: manufacturing, electrical issues, lithographic issues, and circuitry. Example EDA software products from Synopsys, Inc. that can be used at this stage include the Hercules product.

Tape-out (block 127): This stage provides the "tape-out" data for production of masks for lithographic use to produce finished chips. Example EDA software products from Synopsys, Inc. that can be used at this stage include the CATS® family of products.

Resolution enhancement (block 128): This stage involves geometric manipulations of the layout to improve manufacturability of the design. Aerial image simulation based on convolution algorithms executed using multi-core processing systems as described herein, can be used in this stage of the design, as well as other stages. Example EDA software products from Synopsys, Inc. that can be used at this stage include Proteus/Progen, ProteusAF, and PSMGen products.

Mask preparation (block 130): This stage includes both mask data preparation and the writing of the masks themselves. Example EDA software products from Synopsys, Inc. that can be used at this stage include CATS® family of products.

Embodiments of the convolution technology described herein can be used during one or more of the above-described stages.

Figure 2:
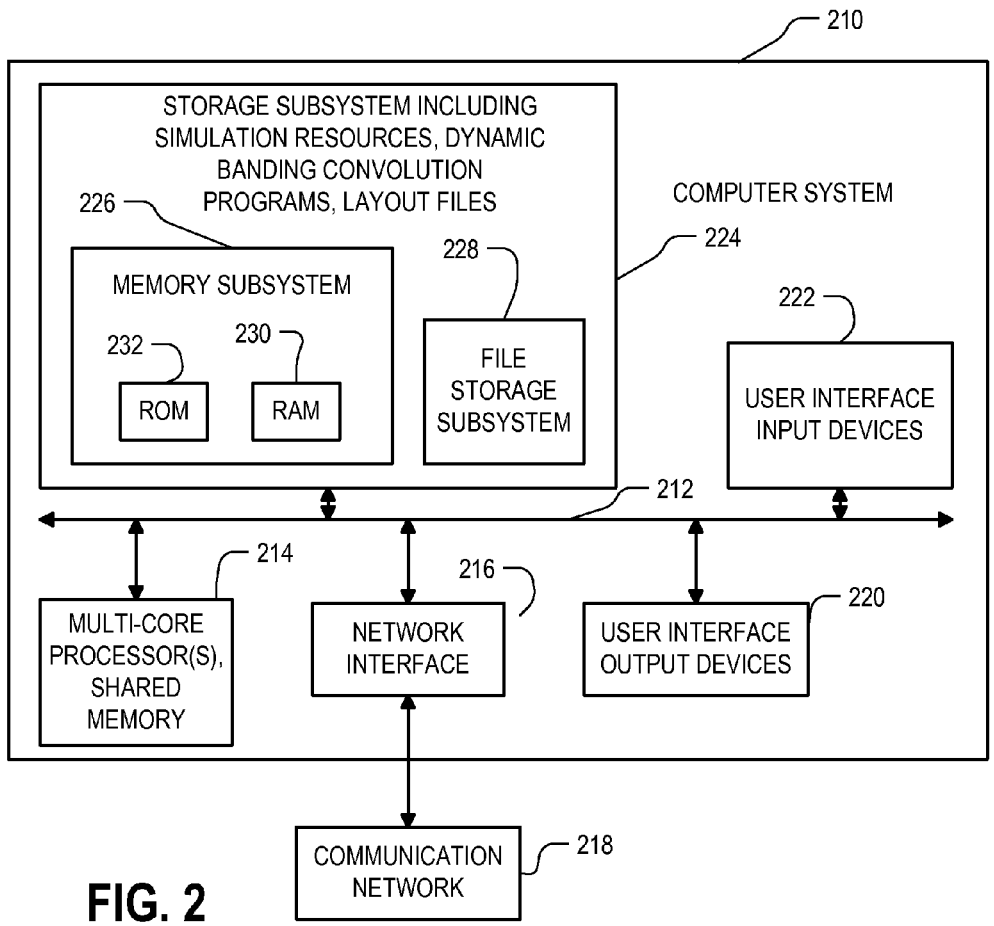
FIG. 2 is a simplified block diagram of a multi-core data processing system suitable for the convolution operation described herein.

FIG. 2 is a simplified block diagram of a computer system 210 suitable for use with embodiments of the technology. Computer system 210 typically includes processor(s) 214 which can communicate with a number of peripheral devices via bus subsystem 212. The processor(s) 214 comprises at least one multi-core processor characterized by including at least one group of two or more multi-processors each having a plurality of cores and a shared memory. Concurrently executing programs, referred to as threads, in the processor cores in each multi-processors access the shared memory for the purpose of communicating among the threads and for the purpose of access to common data sets. A variety of commercially available multi-core processing systems can be applied in this basic computer system, including multi-core processing systems based on one or more NVidia GeForce 200 or Intel Larrabee-class GPU architecture-based devices having many cores. See, Kanter, "NVIDIA's GT200: Inside a Parallel Processor", Real World Technologies, September, 2008; and Seiler, et al., "Larrabee: A Many-Core x86 Architecture for Visual Computing," ACM Trans. Graph. 27, 3, Article 18, August 2008.

The peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 210 or onto communication network 218. The user input devices 222 can be used for identifying evaluation points, selecting kernels or other functions for operations on evaluation points, and for supplying other input data.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system. User interface output devices 220 can be used for providing graphic displays of the results of the operations described herein.

Storage subsystem 224 stores the basic programs of instructions and data constructs that provide the functionality of some or all of the EDA tools described herein, including the layout files, programs for decomposing a layout expressed for example using a GSDII or OASIS standard layout format, into basis units that correspond with shapes in the layout, lookup tables for results of pre-computed convolutions of a number of kernels over the basis units, programs for managing the multi-core algorithms described below, including dynamic banding convolution algorithms with stride-based basis accessing. These software modules are generally executed by processor(s) 214.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 228. The shared memory of a multi-core processor can be separate from the storage subsystem or part of it, depending on the architecture deployed.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Figure 2A:
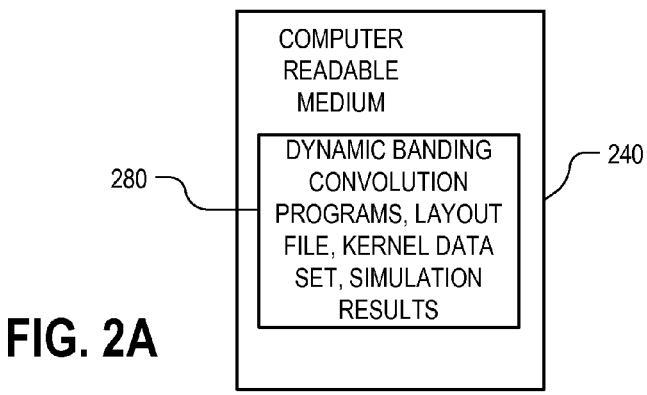
FIG. 2A illustrates a data storage medium storing instructions as described herein.

FIG. 2A shows an article of manufacture comprising a computer readable medium 240, which can be a medium associated with file storage subsystem 228, and/or with network interface subsystem 216. The computer readable medium 240 can be a hard disk, a floppy disk, a CD-ROM, an optical medium, removable media cartridge, a tape drive, flash memory or other data storage medium on which instructions executable by a computer are stored for distribution and/or safekeeping. The computer readable medium 240 stores data structures and executable files 280, including a dynamic banding convolution program as described herein, and optionally one or more of a basis data set, a layout file and simulation results created with the described technology.

The description of computer system 210 depicted in FIG. 2 is intended only for purposes of illustrating the possible embodiments. Many other configurations of computer system 210 are possible having more or less components than the computer system depicted in FIG. 2. The computer system 210 in some embodiments includes a number of stations, each of which can have the components illustrated in FIG. 2, in a distributed architecture or in a server farm arrangement, for performing convolutions over many large layouts and many kernels.

Figure 3:
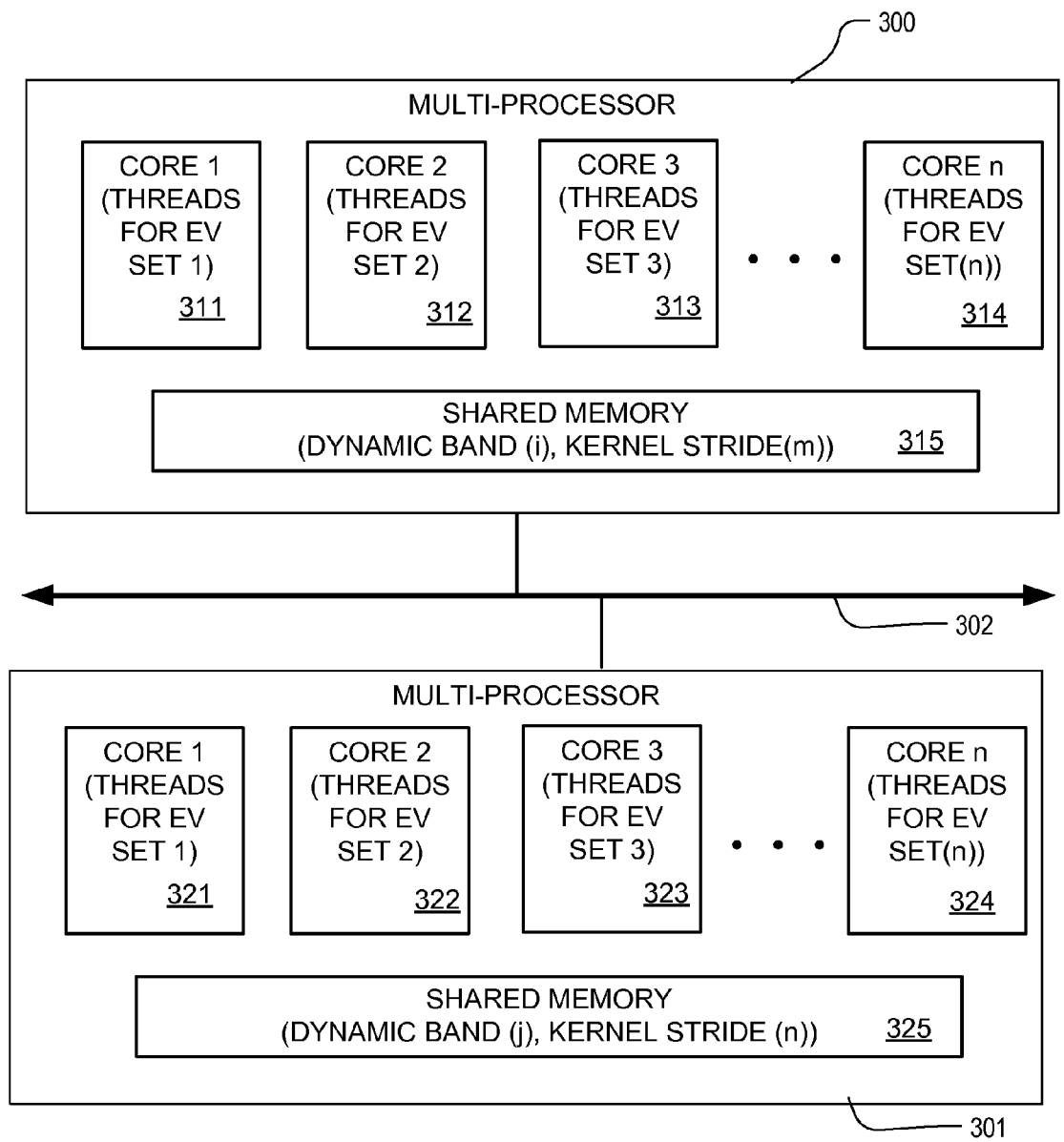
FIG. 3 is a simplified block diagram of a multi-core processor including a plurality of multiprocessors, which can be part of a data processing system like that shown in FIG. 2.

FIG. 3 is a simplified block diagram of a multi-core processing system having a plurality of multi-processors, which can be part of processor(s) 214 in the system of FIG. 2. A system implemented to perform the convolution process described herein can include only one multi-processor or many multi-processors as suit a particular implementation. In the illustrated example, the multi-core processing system in a generalized representation includes a first multi-processor 300 and a second multi-processor 301. The first multi-processor 300 and second multi-processor 301 are coupled to a system bus 302 for access to a storage subsystem and other system resources provided.

The first multi-processor 300 in this example includes processing cores 311-314, which are labeled CORE1 through COREn. The processing cores 311-314 are coupled to shared memory 315, which during execution of a convolution process as described herein stores layout data specifying a sector of the layout, where the sector is referred to as a DYNAMIC BAND(i). In addition, shared memory 315, during execution of a convolution process as described herein, stores part of a basis data set, where this part of the basis data set is referred to as a BASIS STRIDE (m). Processes for selecting and indexing through the DYNAMIC BANDs and the BASIS STRIDEs in order to complete a convolution operation are described below. Each of processing cores 311-314 is adapted to execute convolution threads for corresponding evaluation points EV1 through EVn using the shared memory 315. Each core can handle multiple EV points within a given dynamic band. For example, assuming a system having 8 cores in one multi-processor, a number (e.g., 288, 320, . . . , 480) of EV points can be allocated to each multi-processor and executed in a time-sliced process. The distribution and scheduling of the threads to the 8 cores in the system can be done by multi-core architecture control logic that is adapted to the particular hardware architecture.

The second multi-processor 301 in this example is similar to the first multi-core processor 300. Thus, the second multi-processor 301 includes processing cores 321-324, which are labeled CORE1 through COREn. The processing cores 321-324 are coupled to shared memory 325 which, during execution of a convolution process as described herein, stores layout data specifying a sector of the layer, where the sector is referred to as a DYNAMIC BAND(j). In addition the shared memory 325 stores part of a basis data set, where this part of the basis data set is referred to as a BASIS STRIDE(n). Each of processing cores 311-314 is adapted to execute a convolution thread for a corresponding evaluation point EV1 through EVn using the shared memory 315.

In a representative system, multi-processors 300 and 301 could be implemented using a device having a graphics processing unit GPU architecture, such as the commercially available NVIDIA GT200 in which many processing cores are coupled to a memory architecture that includes a relatively small amount of shared memory for each set of cores. For example, in the NVIDIA GT200, the size of the shared memory is about 16 kBytes.

Figure 4:
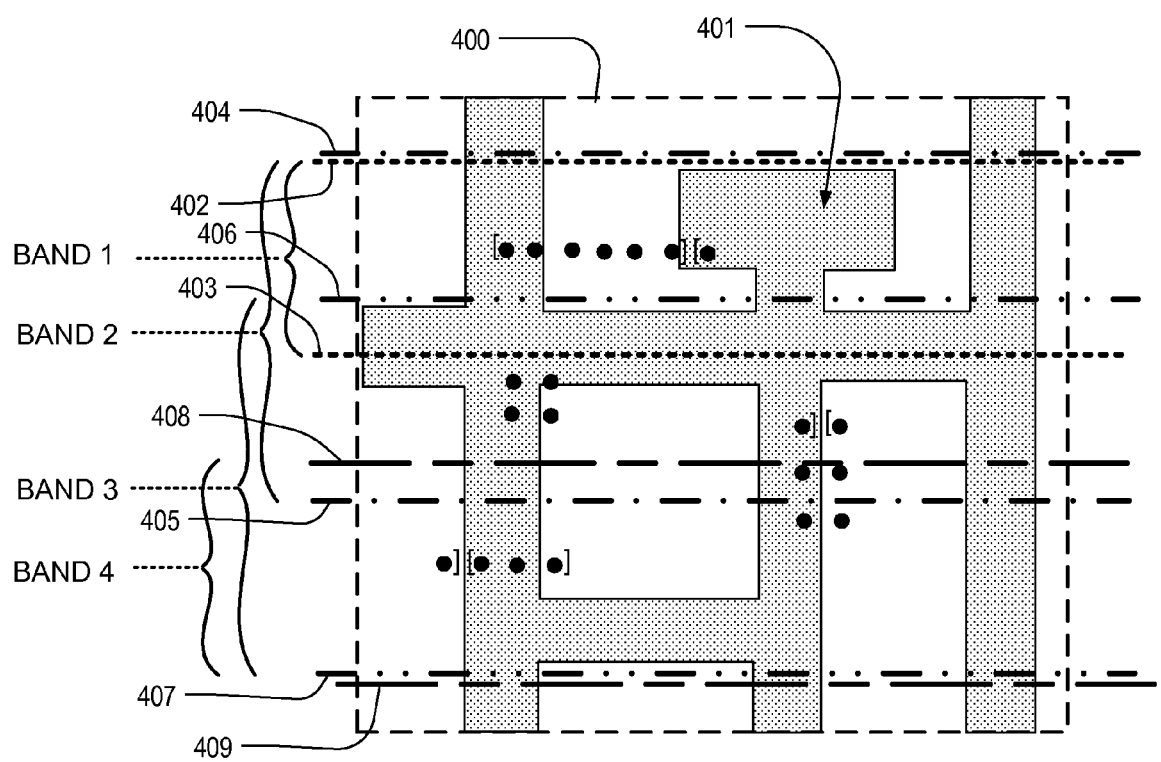
FIG. 4 illustrates part of a layout with evaluation points and dynamic bands as described herein.

FIG. 4 illustrates a portion 400 of a layout, such as the layout of a lithographic mask used in integrated circuit manufacturing. The illustrated portion 400 of the layout has a pattern 401 which can be decomposed into a set of predetermined shapes, called flashes. The predetermined shapes can, for example, be polygons as described in Cong et al. Rieger et al. describes a technique by which the polygons are further decomposed into a set of half-plane basis functions. Using flashes based on the predetermined shapes, any pattern created using the layout rules specified for the system can be represented by a series of flashes which are added and subtracted to create the desired pattern.

FIG. 4 also illustrates a plurality of evaluation points (dots on the figure) over which the convolution operation is to be performed. An operator of an electronic design automation system can manually select the evaluation points to be subject of the analysis, using any of a variety of user input techniques, or the evaluation points can be selected automatically based on pattern matching processes and the type of analysis to be performed, or a combination of manual and automatic selection can be used. The evaluation points in one embodiment correspond to a single point to be evaluated using the convolution process, which can correspond for example to a single pixel in an image produced using aerial image simulation. In alternatives, the evaluation point used in the dynamic banding process can correspond to a set of points to be evaluated, such as might correspond to a patch of an image. In the example shown in FIG. 4 only a few evaluation points are shown for simplicity. A large number of evaluation points can be selected to define areas of interest on the layout. In this example, there are 21 evaluation points positioned on this portion of the layout.

In FIG. 4, evaluation points are grouped (as shown by the square brackets [ . . . ]) into modulo-6 sets, such that each of the sets includes six points (a small number to simplify the illustration), until the last set which includes the remainder. Thus each set of evaluation points includes equal to or less than a predetermined constant. The grouping of the evaluation points is done based on the architecture of the multi-core processing system to be utilized. The number of evaluation points per set is selected so that the multi-core processes are efficiently utilized. For example, in a multi-core processing system having a multi-processor with eight cores, a set of 320 evaluation points could be utilized for each band, so that each point in the band can be subject of a concurrently executing thread.

Dynamic bands, BAND 1 through BAND 4, are illustrated in FIG. 4. The bands define sectors of the layout relevant to a convolution of a kernel and the plurality of evaluation points allocated to the band. Thus, BAND 1 is allocated to the first set of six evaluation points shown in the figure. It has a width which spans the width of a relevant portion of the layout, such as the width of the sector, and a height that is determined based on the locations of a plurality of evaluation points to which it is allocated. In alternative embodiments, both the width and height could be specified based on the locations of the evaluation points. Likewise, BAND 2 is allocated to the second set of six evaluation points shown in the figure. BAND 3 is allocated to the third set of six evaluation points shown in the figure. BAND 4 is allocated to the fourth set of evaluation points, including the remaining three evaluation points, shown in the figure. The height of BAND 1 is determined by the locations of the first or uppermost evaluation point and the last or lowermost evaluation point in the set. The upper boundary 402 of BAND 1 is set at a location offset upwardly in the layout by an extent that is intended to capture all the flashes above the set of evaluation points relevant to the convolution of the kernel over the evaluation points. This extent can be specified in advance based on the types of flashes utilized, the characteristics of the kernel, convolution process selected and so on. Likewise, the lower boundary 403 of BAND 1 is set at a location offset downwardly in the layout from the location of the last evaluation point in the set by an extent that is intended to capture all the flashes relevant to the convolution below the set of evaluation points.

In this example, the first evaluation point in the second set lies in a line with the first set of evaluation points. Thus the upper boundary 404 of BAND 2 lies in the same level in the layout as the upper boundary 402 BAND 1. The lower boundary 405 of BAND 2 lies below the last evaluation point in the second set by the prespecified extent. The upper boundary 406 of BAND 3 lies above the first evaluation point in the third set by the prespecified extent. The lower boundary 407 of BAND 3 lies below the last evaluation point in the third set by the prespecified extent. The upper boundary 408 of BAND 4 lies above the first evaluation point in the fourth set by the prespecified extent, and the lower boundary 409 of BAND 4 lies below the last evaluation point in the fourth set by the prespecified extent, and at the same location as the lower boundary 407 of BAND 3.

The dynamic bands are found, and layout data specifying the sectors corresponding to the dynamic bands are loaded in the shared memory by logic which can be implemented using a computer program executed by the multi-core processing system. It can be seen that the sizes and locations of the dynamic bands vary, and can overlap, based on the locations of evaluation points to which the band is allocated. The sizes of the dynamic bands depend on the techniques used for representing the pattern in the layout.

For a flash-based convolution, a basis data set representing convolution of the kernel over a set of basis units, which define shapes or flashes, is composed of a plurality of lookup tables, including one or more lookup tables for each basis unit. Lookup tables store pre-computed results from a convolution of the kernel over the corresponding basis unit. See, Cong, et al. and Rieger, et al., cited above.

Also, the layout data comprises an array of data structures specifying the basis units that compose the pattern in the corresponding sector. The data structure for a given basis unit called a flash, within a layout file includes an identifier of the type of flash, a number of parameters related to the utilization of the flash, and offset values identifying the location of the flash on the layout. The flashes used to characterize the layout can be organized as an array that is sorted first by rows (y coordinates) and then columns (x coordinates) to facilitate the convolution process. The instances of different types of flashes (acute, corner and obtuse) in the band can organized into separate 1D arrays to specify the layout of the band. The sorting can done in advance, before loading the flash data into the shared memory using global processor resources.

The data structure used for representing a flash can include a number of pre-computed parameters that can be regenerated by computation at runtime, and may use data fields for specifying the type and location of the flash designed to accommodate very large data sets. Thus, in the process of loading the array of data structures representing dynamic bands, the data structures can be reorganized by omitting pre-computed parameters that can be efficiently computed at runtime, by compression, and by rearranging and packing byte-wide fields for bit-by-bit processing in the threads. This reorganization of the data structures in the array representing the flashes in the sector can reduce the amount of memory space in the shared memory needed to store the data structure. This reorganization of the data structures can be done in advance by a host processor coupled to the storage subsystem, or can be done by computer programs being executed by the multi-core processing system during the convolution operation. Likewise, the basis data set for the kernel can be reorganized to reduce the size of the data set, such as by compression and by removing parameters that can be efficiently computed at run time.

Figure 5:
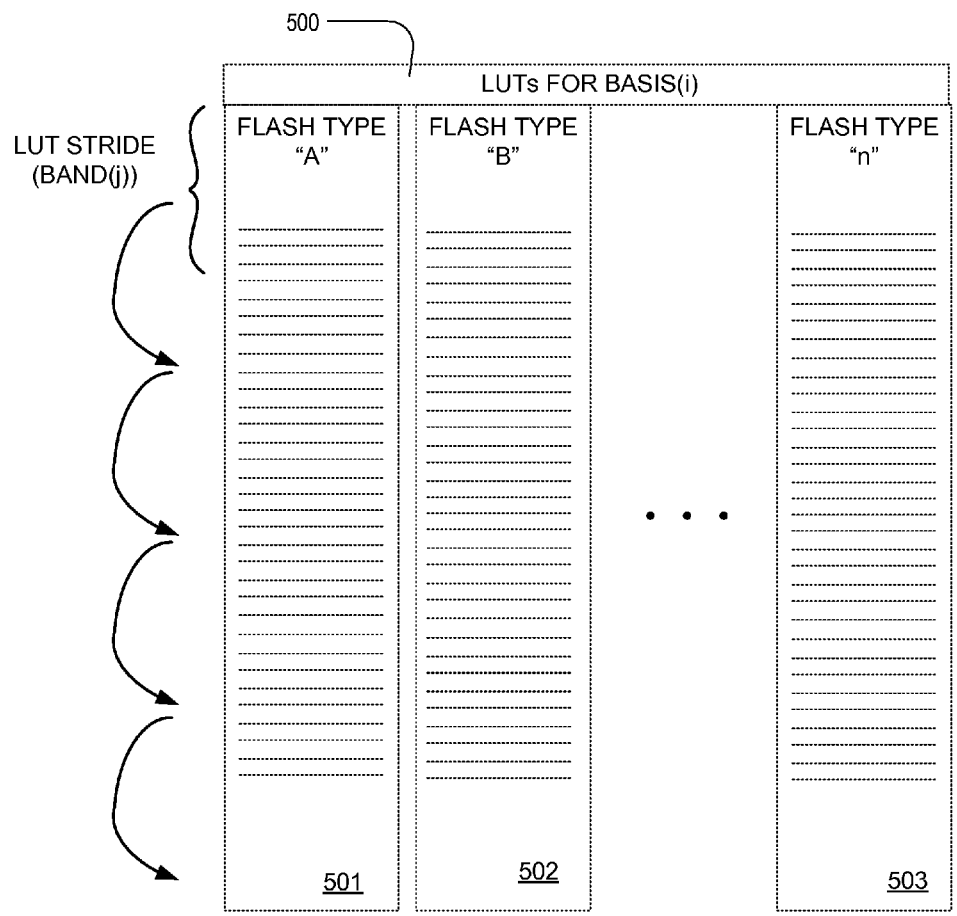
FIG. 5 is a simplified representation of a basis data set, and strides in the basis data set, used in a convolution operation over a layout data as described herein.

FIG. 5 illustrates a simplified data set 500 representing a basis data set, in this example identified as basis (i). The data set 500 includes a plurality of lookup tables that contain pre-convolved data for the flashes that can be used to specify the pattern, and which are indexed by an offset location within the flash. In a system such as that described by Rieger, et al., the lookup tables can contain half-plane basis function flashes, where the data in the look up table includes a central zone (B Zone) where the intensity value produced by the convolution depends on the X- and Y-coordinates of the point, a horizontal zone (H Zone), offset by a horizontal distance from the critical boundary of the flash, where the intensity value produced by the convolution depends only on the X-coordinate of the point, and a vertical zone (V Zone), offset by a vertical distance from the critical boundary of the flash, in which the intensity value produced by the convolution depends only on the Y-coordinate of the point. A fourth zone (F Zone) can be included in which the intensity value produced by the convolution over the flash has a constant value, which can be zero, independent of its location within the F Zone.

The basis data set 500 illustrated in FIG. 5 includes lookup tables 501, 502, . . . 503 for a set of different flash types "A" though "n" (for example, acute type, corner type, obtuse type) which can have a large number of rows of values indexed by coordinates of points to be evaluated. Parts of the basis data set 500 called "strides" can be defined as shown to include a number of rows of data. The strides are sequentially loaded into the shared memory to support convolution over the current dynamic band BAND(i). The size of the stride for a given sector in the layout represented by a dynamic band is determined based on the space available in the shared memory after the array of flashes specifying the dynamic band and other necessary data are loaded. Since the flash array needed to specify the layout within a dynamic band varies by amounts that depend on the distribution of evaluation points to be evaluated, so does the size of the stride used in support of convolution of a specific dynamic band.

Figure 6:
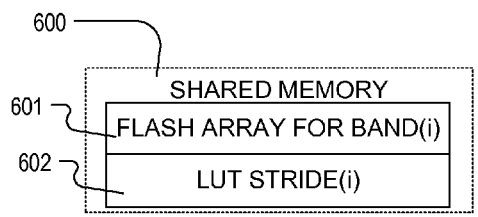
FIGS. 6 and 7 illustrate variations in the allocation of space in a shared memory for dynamic bands and strides as described herein.
Figure 7:
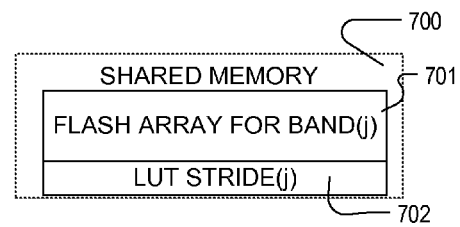

FIGS. 6 and 7 illustrate varying sizes of the areas within the shared memory occupied by the flash array and the strides. FIG. 6 shows a shared memory 600 in which the flash array 601 occupies about half of the area available after storing the flash array and any necessary overhead data, leaving the remaining half of the area available in the shared memory for storing a lookup table stride 602. FIG. 7 shows a shared memory 700 in which the flash array 701 for the dynamic band occupies about two-thirds of the area available, leaving the remaining one third of the area available in the shared memory for a lookup table stride 702.

The shared memory can be divided into three segments in a GPU implementation. The first part includes shared memory used by system operations, function parameters and so on. This part is allocated statically during compiling. The second part is used for storing all flashes in each band. Since different bands will have different numbers of flashes, this part can only be dynamically allocated during runtime. The remainder of the shared memory is used for loading a stride of a current basis data set. Depending on how much memory space is available after dynamically allocating space for flash data, the number of basis rows that can fill the rest of the shared memory can be calculated. For example, if there are 500 flashes in a certain band, since each flash costs 10 bytes, 5K bytes of shared memory is used for the flash data defining the layout of the band. In a representative implementation, about 1K bytes could be reserved for system use and function parameters. Therefore, this leaves 16K−5K−1K=10K bytes available for loading basis data. Therefore, the remaining memory allows loading 10K/512=20 rows of a 2D basis table at one time. For instance, we load row 0 to row 19. Then for each evaluation point, we can search in the band flash list (which is already in the shared memory and can be accessed efficiently) to find those flashes whose distances to the current evaluation point is within the range of row 0 to row 19 (this can be roughly thought of as row 0 to row 19 defines the lookup table for those flashes that are within the top 20 lines of the flash proximity).

Figure 8:
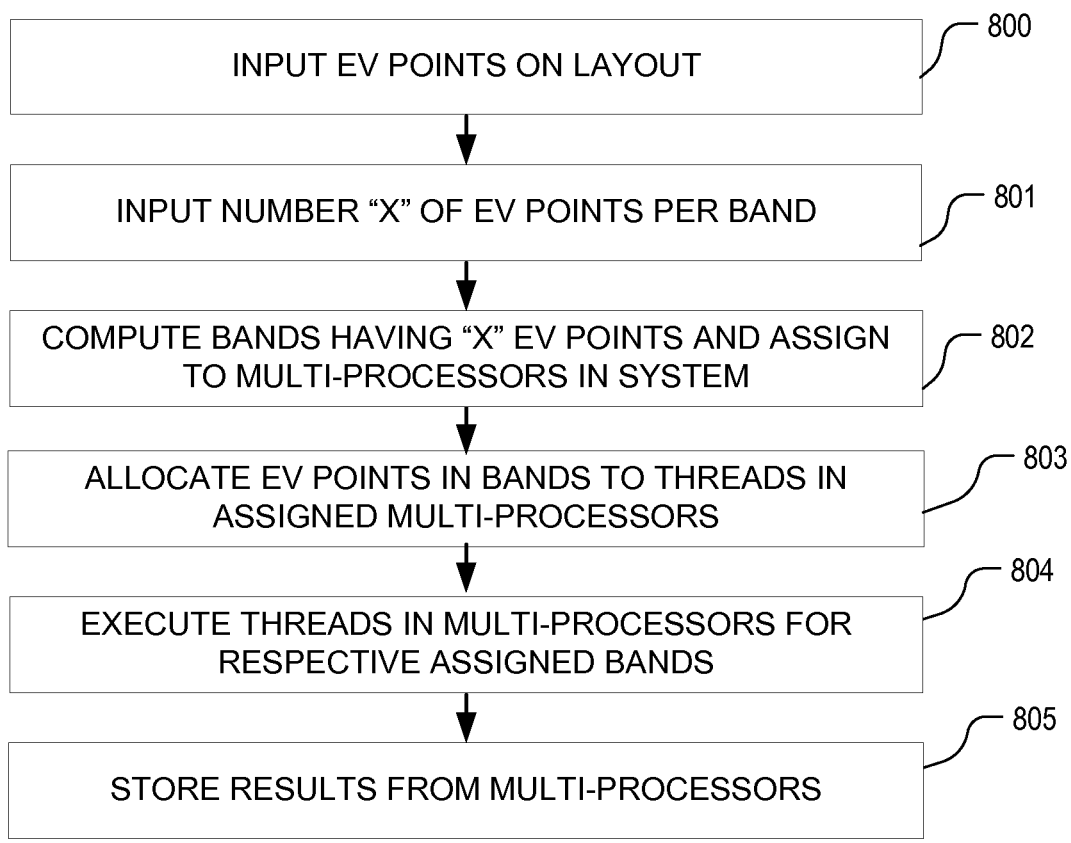
FIG. 8 is a simplified flow chart of a convolution process for a multi-core processing system including a plurality of multi-processors.
Figure 9:
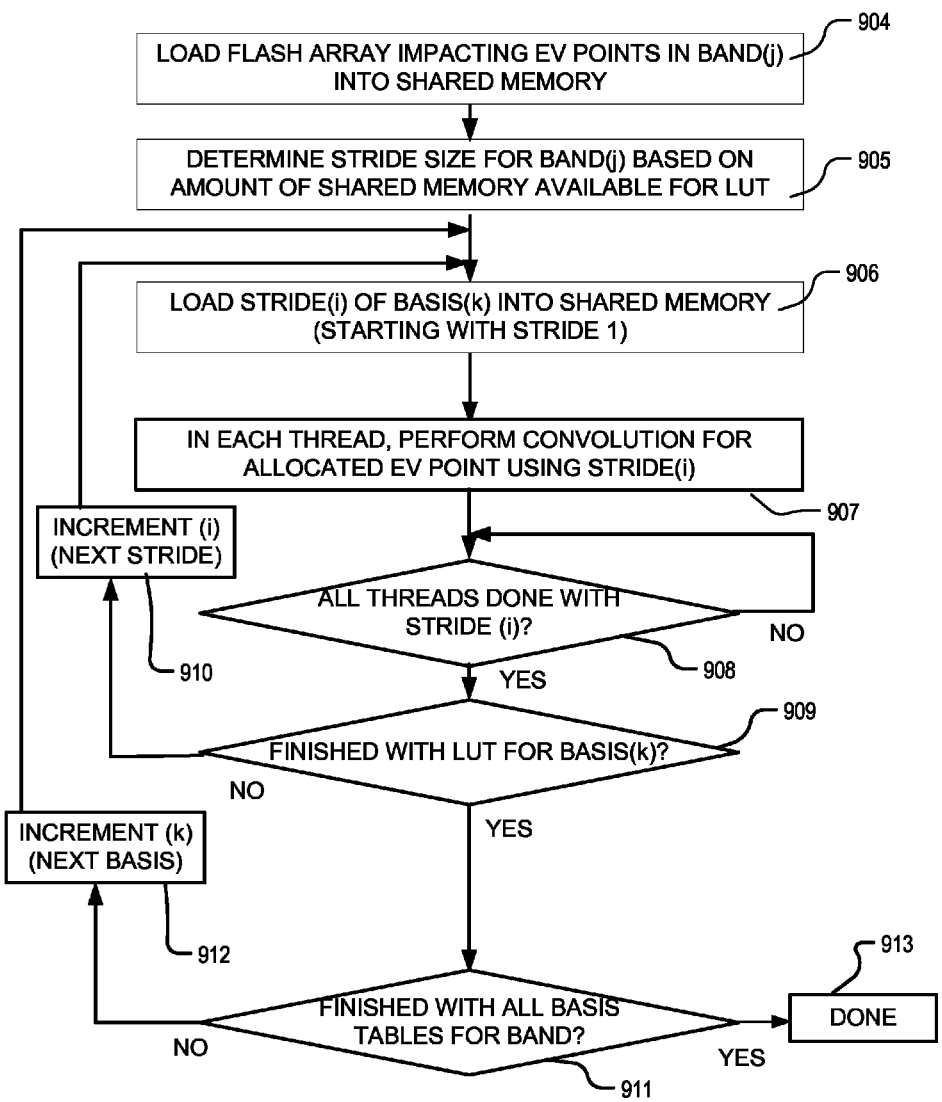
FIG. 9 is a flow chart illustrating a data processing algorithm utilizing a multi-processor for convolution of evaluation points using dynamic banding of a layout file with strides in a basis data set.

FIGS. 8 and 9 provide flowcharts representing logic which can be executed by a multi-core processing system to perform a convolution of a kernel over a plurality of evaluation points in a layout. The order of the steps represented in these flowcharts can be rearranged as suits a particular implementation. The basic process shown in FIG. 8 starts with input specifying evaluation points on a layout to be evaluated (800) which can be provided manually, automatically or both manually and automatically. Also, input is received that specifies the number of evaluation points per band (801). The bands in the layout are dynamically computed to specify regions having the number "X" of evaluation points, and each band can be allocated to a multi-processor in the system (802). For example, in a system having 32 multi-processors, 32 bands can be defined, and each assigned to a corresponding multi-processor. Also, the evaluation points in each band are allocated to threads which can be executed by the cores in the corresponding multi-processor (803). The allocations of the bands to the multi-processors and of the evaluation points to the threads can be performed by the scheduling process being executed in the multi-core processing system. Next, the process executes the threads using the multi-processors for their assigned bands (804). This process is shown in more detail in FIG. 9. Finally, the results from the multi-processors in the system can be written back to a common file storing the combined results of the convolution for all of the evaluation points in the layout (805).

As mentioned above, the multi-core processing system can be implemented a large number of multi-processors, each including a plurality of cores executing threads which share access to a single shared memory. The process illustrated in FIG. 9 shows steps associated with a single multi-processor and a single shared memory.

For a given set of cores, the process proceeds by loading a flash array corresponding to an assigned band, BAND(j) specifying the sector of the layout that impacts the evaluation points in the current band into the shared memory (904). Also, the amount of shared memory available, or to be available, after loading the flash array for the current band into the shared memory is determined, and a stride size for the basis data set to be used for a current band is determined (905). The stride size indicates the size of a part of the basis data set that can be loaded in the shared memory along with the flash array for the current band. The stride size can be a parameter such as the number of rows in the lookup tables, or other indicator of size.

Given the stride size, the process proceeds to load a current stride, STRIDE (i) from the basis data set (basis (k)) into the available area in shared memory, starting with the index i equal to 1 (906). When the layout data for BAND (j) and the current stride of basis (k) are loaded into the shared memory, each of the threads can concurrently perform convolution over the evaluation points allocated to that thread (907). The convolution is performed in each thread for the evaluation point allocated to that thread by sequentially scanning through every possible distance between the evaluation point and the flashes in the dynamic band. For example, all threads for the evaluation points in the current band first check if there exist any flashes at the relative distance (0,0), then at (0,1), then at (0, 2) and so on through the tables specifying the basis data set. This sequential processing facilitates the synchronization of access to strides of the data set, and prevents memory churning that can slow down the processing. The threads store an accumulation of output values that are produced as a result of the convolution operation over the current stride and previous strides. The threads synchronize on each stride by waiting for all of the concurrently operating threads which access a common shared memory to complete the convolution over the current stride from the basis data set (908). So, at step 908, if all the threads have not completed the process for the current stride, then the algorithm waits until all threads are done with stride (i). If at step 908, the threads are synchronized, the process determines whether the convolution operation has been completed over all strides of the basis data set for the current basis (909). If the convolution operation has not used the complete basis data set, then the index (i) for the basis stride is incremented (910), and the process loops to step 906 to load the next stride. If at step 909, it is determined that the convolution process has completed over the basis data set, the process determines whether the convolution operation has completed for all of the basis data sets to be evaluated (911). If the convolution operation has not completed over all of basis data sets, then index (k) for the basis list is incremented (912) and the process loops to step 906 to process the next basis data set. If at step 911 it is determined that the convolution operation is finished for all of the input basis data sets, then the multithreading operation is complete (913).

In some embodiments, the striding process is applied only to basis data in tables that have a size exceeding the available space in the shared memory. In some embodiments, the basis data for a single basis function over a single flash type can be represented by a combination of one or more large 2D tables and one or more smaller 1D tables and constants. In this case, the striding can be implemented only over the large 2D tables while entire 1D tables are also stored in shared memory.

Thus, the size of dynamic band is determined based on the location of the evaluation points within the band, and the size of the stride is determined based on the amount of space available in the shared memory given the size of the layout data specifying the dynamic band. These parameters change with each set of evaluation points. Also, these parameters can be optimized for efficient utilization of the storage subsystem by loading shared data in the shared memory which can be used concurrently by a plurality of threads without requiring each thread to go beyond the shared memory to the storage subsystem.

FIG. 10 includes a pseudocode representation of one embodiment of a multi-processor executed stride-based convolution algorithm for dynamic bands in which the basis units, or flashes, comprise half-plane basis functions like those described in Rieger et al. In the embodiment represented by this pseudocode, the flash data representing a dynamic band allocated to the multi-processor for this thread is loaded in a 1D array that identifies the flashes organized by flash type and location, and a synchronization point is provided (lines 1-2).

Next, an outer loop (lines 3-36) is executed over each basis data set (basis (i)) on which the convolution is to be performed, where a basis data set comprises a set of lookup tables and other parameters corresponding to the convolution of a corresponding set of flash types with a kernel. Within the outer loop, the intensity of the evaluation point is first set to zero (line 4). Then, a 1D basis table for H Zone convolution and possibly other data concerning the basis(i) such as the variable K(i) mentioned below, are loaded to the shared memory and a synchronization point is provided (lines 5-6).

A first inner loop (lines 7-23) involves loading a stride of 2D basis data for the B Zone and performing the convolution to update the intensity data for the H Zone basis table and B Zone basis stride. The first inner loop includes second inner loop (lines 8-22) in which individual strides of the H Zone basis table for a current flash type are loaded one stride at a time, and after loading a current stride, a synchronization point is provided (lines 9-10). Next, a binary search can be used to identify flashes that are located within the range of the data of the current stride (line 11). A third inner loop (lines 12-19) is then executed for each flash in the identified set. In the third inner loop, the convolution is performed for each B Zone flash by a 2-D table lookup within the stride with interpolation for evaluation points off grid (lines 13-14). The third inner loop traverses all of the H Zone flashes, and taking advantage of the fact that the convolution of each of the H Zone flashes is a positive or negative integer multiplied by a constant, accumulates the value of integers in the variable hflash_cnt, and for the last H Zone flash, a 1D look up is executed with interpolation for evaluation points off grid, and the result is multiplied by hflash_cnt to produce the accumulated convolution value for H Zone flashes at the evaluation point (lines 15-19). After completion of the third inner loop, a synchronization point is provided (line 21), ending the second inner loop, and the first inner loop.

Next, in this embodiment, a 1D basis table for V Zone convolution is stored in the shared memory, and a synchronization point is provided (lines 24 and 25). A binary search is conducted to find the flashes relevant to the evaluation point (line 26) in their V Zone or F Zone. Then a loop (lines 27-33) is executed in which a 1D lookup operation is executed, with interpolation for evaluation points off grid for each V Zone flash in the list. Also, for F Zone flashes, a count is maintained (line 31). After all the flashes in the list produced at line 26 are traversed, the loop at lines 27-33 is complete. Then the intensity is updated by adding a value equal to the F Zone flash count time the constant K(i) for the basis(i), where K(i) can be zero or another value unique to the particular basis (line 34). Finally, the intensity value for the evaluation point is stored in global memory (line 35).

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for determining results of a function over evaluation points in a target data set, comprising:
    identifying a sector of the target data set including a plurality of evaluation points, the sector including a portion of the target data set relevant to the function for the plurality of evaluation points in the sector; and
    loading a band of data specifying basis units of the sector of the target data set in a memory, and performing an operation to determine the results of the function for the plurality of evaluation points in the sector;

the operation including iteratively loading parts of a basis data set into space available in the memory given the size of the band of data specifying basis units of the sector, the basis data set representing results of the function for basis units of the target data set, and executing a thread using the band of data specifying basis units of the sector loaded in the memory and a currently loaded part of the basis data set, until the plurality of evaluation points in the sector is evaluated over the basis data set for the basis units in the band.

2. The method of claim 1, including identifying a plurality of sectors, including said sector, of the target data set, each sector in the plurality including a portion of the target data set relevant to the function for respective pluralities of evaluation points; and distributing layout data specifying each sector of the layout to respective processors and performing said operation for the evaluation points in the plurality of sectors using the respective processors.

3. The method of claim 2, wherein the target data set represents a pattern in two dimensions, and sectors in the plurality of sectors comprise respective bands of the target data set having sizes determined based on the locations in the target data set of evaluation points within the band.

4. The method of claim 1, wherein said target data set represents a combination of shapes selected from a predetermined set of shapes, the target data set including for each shape in the combination, data specifying the predetermined shape and its location.

5. The method of claim 4, wherein said basis data set comprises a set of lookup tables containing results of the operation and the predetermined set of shapes.

6. The method of claim 1, wherein the plurality of evaluation points includes a number of evaluation points equal to or less than a predetermined constant.

7. The method of claim 1, wherein the target data set represents a pattern in two dimensions, and the sector comprises a band of the target data set having a width that spans the sector in one dimension and a height determined based on the locations of the plurality of evaluation points.

8. The method of claim 1, wherein said basis data set comprises a set of lookup tables containing results of the operation and the predetermined set of shapes, and the parts of the basis data set comprise a number of rows of one or more of the lookup tables in the set, which can be loaded in the memory.

9. The method of claim 1, wherein the target data set comprises data representing features of a specified pattern.

10. A data processing system, comprising:

a processor including memory storing instructions executable by the processor, a target data set representing a pattern and a basis data set specifying a function of a kernel and the target data set; the instructions including logic to identify a sector of the target data set including a plurality of evaluation points, the sector including a portion of the target data set relevant to the function for the plurality of evaluation points in the sector; and logic to load a band of data specifying basis units of the sector of the target data set in a memory, and to perform an operation to determine the results of the function for the plurality of evaluation points in the sector;

the operation including iteratively loading parts of a basis data set into space available in the memory given the size of the band of data specifying basis units of the sector, the basis data set representing results of the function for basis units of the target data set, and executing a thread using the band of data specifying basis units of the sector loaded in the memory and a currently loaded part of the basis data set, until the plurality of evaluation points in the sector is evaluated over the basis data set for the basis units in the band.

11. The system of claim 10, the instructions including logic to identify a plurality of sectors, including said sector, of the target data set, each sector in the plurality including a portion of the target data set relevant to the function for respective pluralities of evaluation points; and distribute layout data specifying each sector of the layout to respective processors and perform said operation for the evaluation points in the plurality of sectors using the respective processors.

12. The system of claim 11, wherein the target data set represents a pattern in two dimensions, and sectors in the plurality of sectors comprise respective bands of the target data set having sizes determined based on the locations in the target data set of evaluation points within the band.

13. The system of claim 10, wherein said target data set represents a combination of shapes selected from a predetermined set of shapes, the target data set including for each shape in the combination, data specifying the predetermined shape and its location.

14. The system of claim 13, wherein said basis data set comprises a set of lookup tables containing results of the operation and the predetermined set of shapes.

15. The system of claim 10, wherein the plurality of evaluation points includes a number of evaluation points equal to or less than a predetermined constant.

16. The system of claim 10, wherein the target data set represents a pattern in two dimensions, and the sector comprises a band of the target data set having a width that spans the sector in one dimension and a height determined based on the locations of the plurality of evaluation points.

17. The system of claim 10, wherein said basis data set comprises a set of lookup tables containing results of the operation and the predetermined set of shapes, and the parts of the basis data set comprise a number of rows of one or more of the lookup tables in the set, which can be loaded in the memory.

18. The system of claim 10, wherein the target data set comprises data representing features of a specified pattern.

19. An article of manufacture comprising a machine readable data storage medium storing instructions executable by a processor; the instructions including logic to identify a sector of the target data set including a plurality of evaluation points, the sector including a portion of the target data set relevant to the function for the plurality of evaluation points in the sector; and logic to load a band of data specifying basis units of the sector of the target data set in a memory, and to perform an operation to determine the results of the function for the plurality of evaluation points in the sector;

the operation including iteratively loading parts of a basis data set into space available in the memory given the size of the band of data specifying basis units of the sector, the basis data set representing results of the function for basis units of the target data set, and executing a thread using the band of data specifying basis units of the sector loaded in the memory and a currently loaded part of the basis data set, until the plurality of evaluation points in the sector is evaluated over the basis data set for the basis units in the band.

* * * * *